United States Patent [19]

Uchiyama et al.

[11] Patent Number: 5,015,007

[45] Date of Patent: May 14, 1991

[54] DAMPING FORCE CONTROL SYSTEM FOR SHOCK ABSORBER VARIABLE WITH AMPLITUDE OF VEHICLE HEIGHT DIFFERENCE EXCEEDING LIMIT VALUE

[75] Inventors: Hiromitsu Uchiyama; Masayuki Kawamoto, both of Toyota; Yoriko Inada, Nagoya, all of Japan

[73] Assignee: Toyota Jidosha Kabushik Kaisha, Aichi, Japan

[21] Appl. No.: 381,867

[22] Filed: Jul. 19, 1989

[30] Foreign Application Priority Data

Jul. 29, 1988 [JP] Japan ................... 63-191226

[51] Int. Cl.$^5$ ............... B60G 17/015; B60G 17/08
[52] U.S. Cl. ..................... 280/707; 280/703
[58] Field of Search ......... 280/707, 702, 714, DIG. 1, 280/703; 364/424.05; 188/299

[56] References Cited

U.S. PATENT DOCUMENTS

| | | | |
|---|---|---|---|
| 4,600,215 | 7/1986 | Kuroki et al. | 280/707 |
| 4,671,534 | 5/1987 | Yano | 280/707 |
| 4,673,194 | 6/1987 | Sugusawa | 280/707 |
| 4,674,767 | 8/1987 | Kuroki et al. | 280/707 |
| 4,686,626 | 6/1987 | Kuroki et al. | 280/707 |
| 4,744,589 | 5/1988 | Buma | 280/707 |
| 4,756,549 | 7/1988 | Kurosawa et al. | 280/707 |

FOREIGN PATENT DOCUMENTS

| | | |
|---|---|---|
| 60-47711 | 3/1985 | Japan ............... 280/707 |
| 61-184113 | 8/1986 | Japan . |
| 61-287808 | 12/1986 | Japan . |
| 62-11010 | 1/1987 | Japan . |
| 62-168704 | 7/1987 | Japan . |
| 62-258806 | 11/1987 | Japan . |
| 62-265012 | 11/1987 | Japan . |
| 63-116919 | 5/1988 | Japan . |
| 63-154414 | 6/1988 | Japan . |

*Primary Examiner*—Charles A. Marmor
*Assistant Examiner*—Karin Tyson
*Attorney, Agent, or Firm*—Oliff & Berridge

[57] ABSTRACT

In a damping force control system for switching over a shock absorber in the suspension of a vehicle from a low damping force operation to a high damping force operation when a vehicle height difference exceeds a determinate limit value, the shock abosrber is switched over from the low damping force operation to the high damping force operation after the lapse of a delay period so that the shock absorber is continually maintained at the high damping force operation from a time point at which the vehicle height difference generally reaches a peak amplitude of its variation for a time duration which is increased as a peak amplitude of the vehicle height difference exceeding the determinate limit value increases.

2 Claims, 5 Drawing Sheets

DAMPING FORCE CONTROL SYSTEM FOR SHOCK ABSORBER VARIABLE WITH AMPLITUDE OF VEHICLE HEIGHT DIFFERENCE EXCEEDING LIMIT VALUE

BACKGROUND OF THE INVENTION

1. Field of the Invention

The present invention relates to a shock absorber incorporated in a suspension system of a vehicle such as an automobile, and more particularly, to a damping force control system for such a shock absorber.

2. Description of the Prior Art

In Japanese Patent Laying-open Publication No. 62-168704 and Japanese Utility Model Laying-open Publication No. 62-11010 there is disclosed a damping force control system for a shock absorber incorporated in a suspension system of a vehicle such as an automobile which is adapted to switch over the damping force of the shock absorber to a high level when the relative displacement between the wheel and the vehicle body has increased beyond a predetermined limit value, maintaining the shock absorber at the high damping force operation until the relative displacement decreases substantially to zero. In such a damping force control system, when the vehicle runs on a rough road such as an unpaved road, the switching over of the damping force between a low level and a high level occurs at a very high frequency, causing a problem that the durability of the shock absorber and the actuator therefor is low.

In view of such a problem it is contemplated to maintain the shock absorber at the high damping force operation for a predetermined period when the relative displacement between the wheel and the vehicle body has increased beyond a determinate value. However, if the period for maintaining the shock absorber at the high damping force operation is predetermined, it will occur that the shock absorber is operated for a too long period at the high damping force on a road having smaller roughness, thereby unnecessarily lowering the comfortableness in riding, while on a road having larger roughness the shock absorber is operated at the high damping force for a too short period to ensure the stability in maneuvering.

SUMMARY OF THE INVENTION

In view of the above-mentioned problems it is the primary object of the present invention to provide a damping force control system for a shock absorber which is improved so as to obtain high comfortableness in riding and high stability in maneuvering of the vehicle without sacrificing the durability of the shock absorber and the actuator therefor.

According to the present invention, the above-mentioned object is accomplished by a damping force control system for a shock absorber mounted between a vehicle wheel and a vehicle body of a vehicle such as an automobile and adapted to selectively provide a high damping force operation or a low damping force operation, comprising a vehicle height difference detecting means for detecting a vehicle height difference of the vehicle body relative to the vehicle wheel, and a shock absorber control means for controlling said shock absorber to provide said high damping force operation or said low damping force operation, said shock absorber control means controlling said shock absorber to provide said high damping force operation for a determinate time duration when said vehicle height difference exceeds a determinate limit value, wherein said shock absorber determines said determinate time duration to be longer as a peak amplitude of said vehicle height difference exceeding said determinate limit value is larger.

According to the above-mentioned damping force control system, when the vehicle runs on a rough road, the shock absorber is operated at the high damping force for a longer period with less frequency of switching over between the low damping force operation and the high damping force operation as the peak amplitude of the vehicle height difference exceeding a limit value increases, thus improving the durability of the shock absorber and the drivability in maneuvering on rough road, while high comfortableness in riding is ensured on normal road.

In the damping force control system according to the present invention, said shock absorber may be switched over from said low damping force operation to said high damping force operation after the lapse of a determinate delay time duration from a time point when said vehicle height difference exceeded said determinate limit value. In this connection, said delay time duration may be comparable with a time lapse between said time point at which said vehicle height difference exceeded said determinate limit value and a time point at which said peak amplitude of said vehicle height difference occurs.

Further, the damping force control system according to the present invention may further comprise a vehicle speed detecting means, said determinate time duration for setting said shock absorber at said high damping force operation may be varied according to vehicle speed detected by said vehicle speed detecting means so as to be increased along with the increase in vehicle speed.

BRIEF DESCRIPTION OF THE DRAWINGS

In the accompanying drawing.

DESCRIPTION OF THE PREFERRED EMBODIMENT

In the following the present invention will be described in more detail with respect to a preferred embodiment and with reference to the accompanying drawings.

Figure 1:
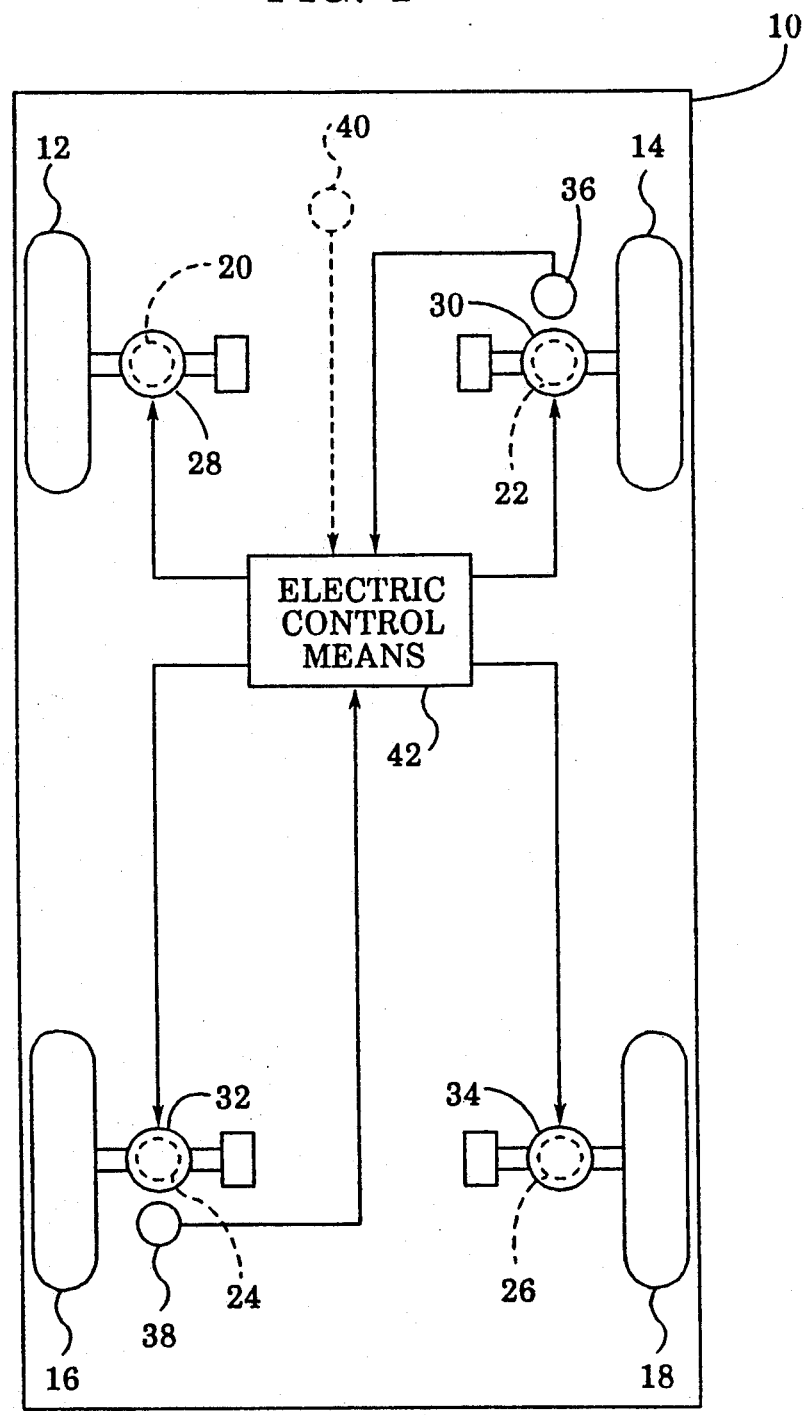
FIG. 1 is a diagrammatical plane view showing a vehicle with suspension shock absorbers and actuators for controlling the damping force thereof together with a damping force control system according to the present invention.

Referring first to FIG. 1, a vehicle body 10 is supported by a front left wheel 12, a front right wheel 14, a rear left wheel 16 and a rear right wheel 18. Suspension systems for the wheels 12-18 incorporate shock absorbers 20, 22, 24 and 26, respectively, and these shock absorbers are equipped with actuators 28, 30, 32 and 34, respectively, for switching over the shock absorbers between a first condition for providing a low damping force and a second condition for providing a high damping force. In the shown embodiment the vehicle height, i.e. relative displacement between the vehicle wheel and the vehicle body, at a front portion of the vehicle is detected by a vehicle height sensor 36 incorporated in a suspension system for the front right wheel 14, and the vehicle height at a rear portion of the vehicle is detected by a vehicle height sensor 38 incorporated in the suspension system for the rear left wheel 16. Further, as is required in a later embodiment, a vehicle speed sensor 40 for detecting vehicle speed may be provided. These sensors provide output signals to an electric control means 42 which controls the actuators 28-34 based upon the signals received from the sensors.

Figure 2:
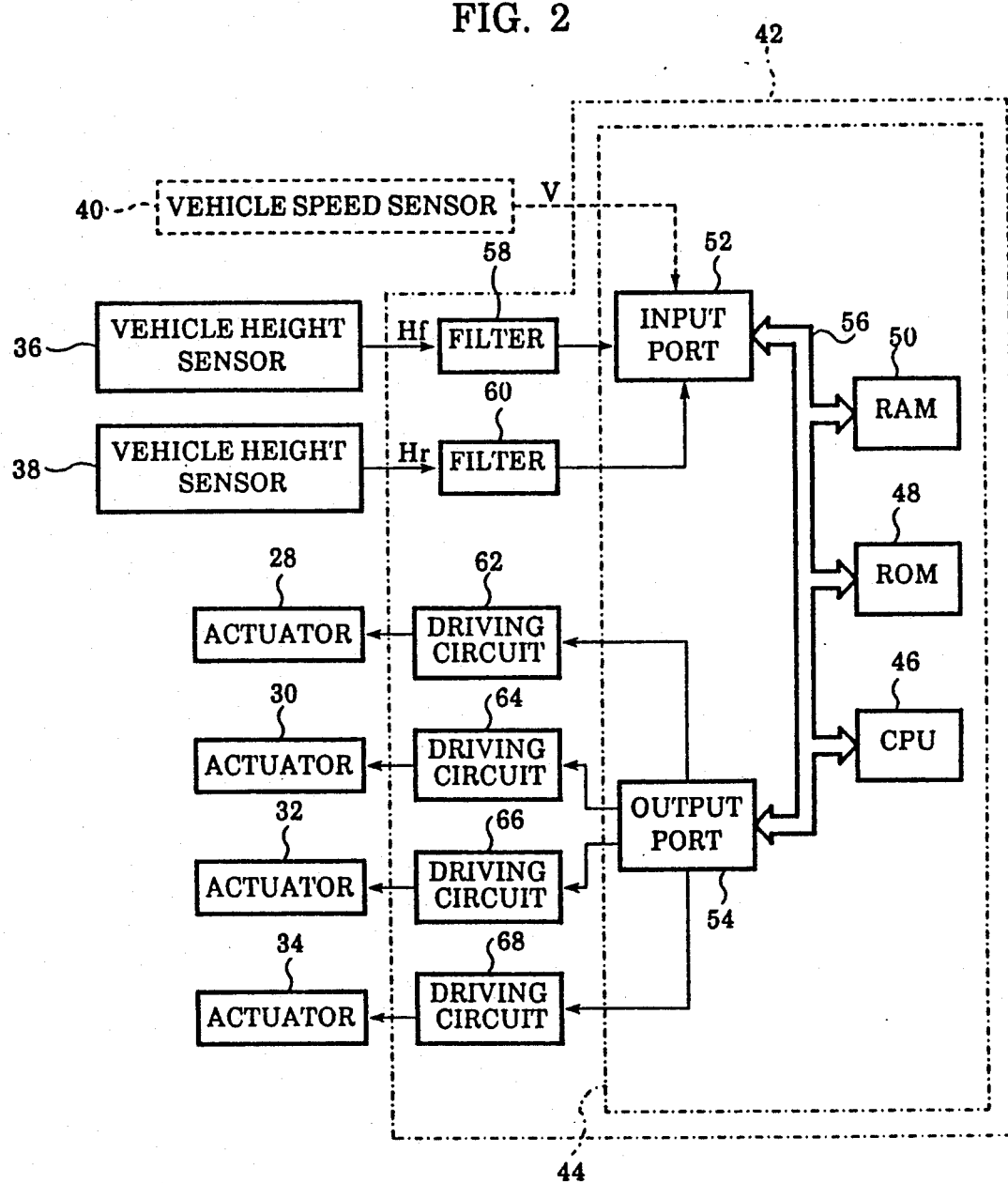
FIG. 2 is a block diagram showing an electric control system in the damping force control system shown in FIG. 1.

As shown in FIG. 2, the electric control means 42 comprises an electronic micro computer 44 which itself is of a common construction in this art and includes a central processing unit (CPU) 46, a read only memory (ROM) 48, a random access memory (RAM) 50, an input port means 52, an output port means 54 and a common bus 56 interconnecting these elements.

The vehicle speed sensor 40, when provided, supplies a signal representing vehicle speed V to the input port means 52. The vehicle height sensors 36 and 38 supply signals representing front vehicle height Hf and rear vehicle height Hr to the input port means 52 through filters 58 and 60, respectively. These filters remove high frequency components such as more than 1-2 Hz which are resonant frequencies of the vehicle body and a direct current component corresponding to the static load on the vehicle variable with the number of passengers from the signals supplied to the input port 52. ROM 48 stores a program for conducting a control operation such as shown in the flowchart in FIG. 3 and a map for a relation between variables such as shown in FIG. 4. CPU 46 conducts a computing operation with assistance of ROM 48 and RAM 50 based upon the data supplied through the input port means 52 so as to output control signals toward the output port means 54.

In the following an embodiment of the damping force control system for the shock absorber according to the present invention will be described in the form of operations thereof in accordance with a flowchart showing the control processes carried out by the system according to the invention. Further, for the sake of convenience and clarity of the description and illustration, in the following the invention will be described only about the shock absorbers for the front wheel suspension. However, it will be understood that the same or similar control may also be applied to the shock absorbers for the rear wheel suspension according to an appropriately alternated order of repetition therebetween. Therefore, it is to be noted that the present invention is not limited to the damping force control for the shock absorbers in the front suspension of a vehicle. Further, for the same purposes of convenience and clarity, it is assumed that the same damping force control is given to the shock absorbers 20 and 22 for the front left and right wheels 12 and 14 based upon the output signal from the front vehicle height sensor 36.

Referring now to FIGS. 3 and 4 and FIGS. 5-7, an embodiment of the present invention will be described.

Figure 3:
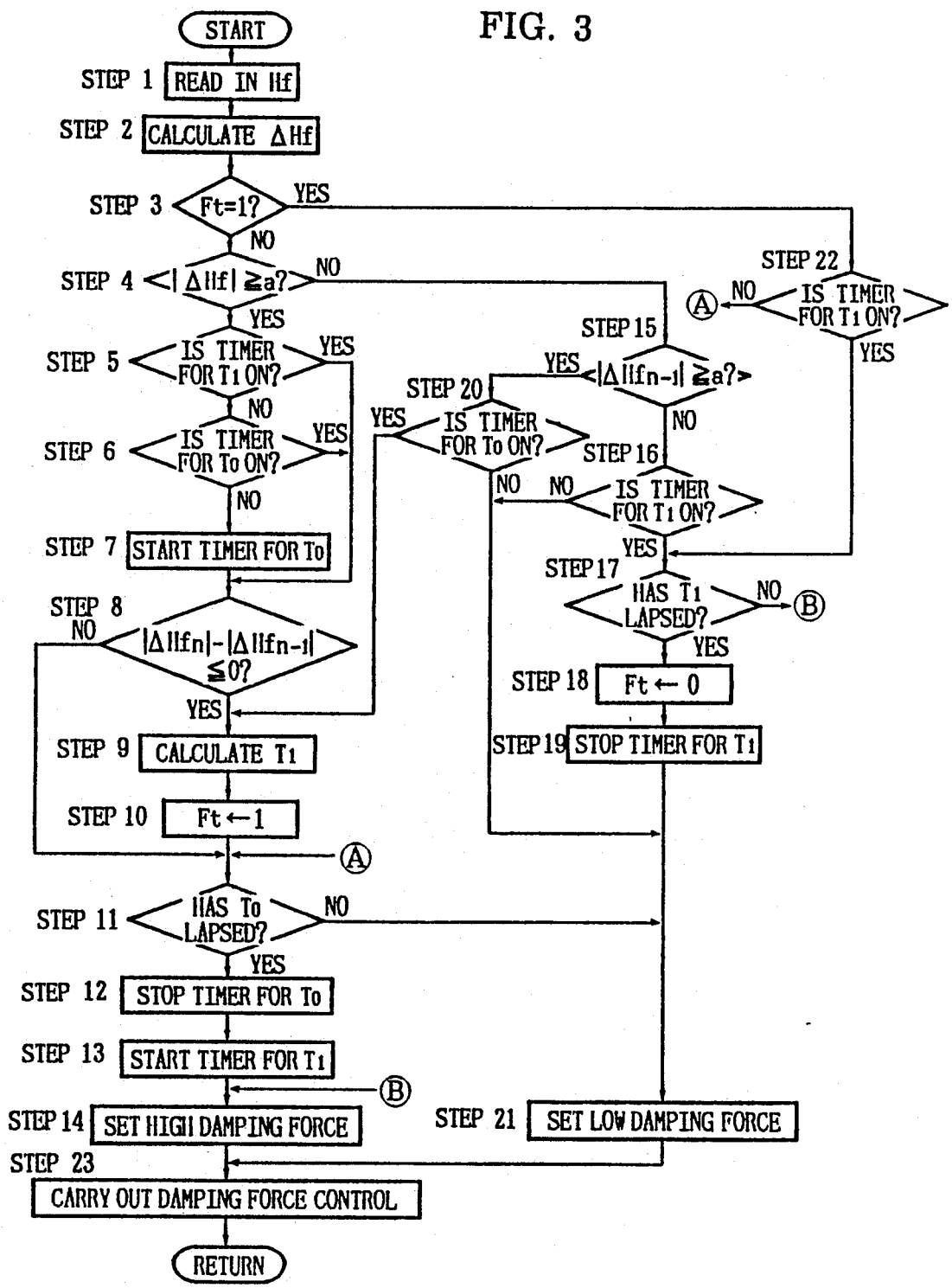
FIG. 3 is a flowchart showing the control operation of an embodiment of the damping force control system according to the present invention.
Figure 4:
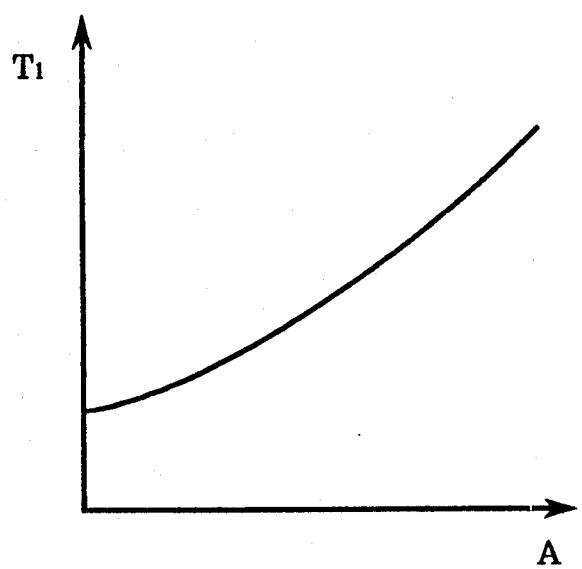
FIG. 4 is a graph showing a relation between the maximum amplitude of the displacement between the vehicle wheel and the vehicle body exceeding a predetermined limit value and the time duration for setting the shock absorber at the high damping force operation according to the flowchart in FIG. 3.

In the flowchart in FIG. 3, in step 1 vehicle height Hf at the front suspension is read in from the front vehicle height sensor 36. Then the process proceeds to step 2. In step 2 the difference of the vehicle height Hf from a standard vehicle height $Hf_0$ is calculated as $\Delta Hf = Hf - Hf_0$, and then the process proceeds to step 3. In step 3 it is checked if a flag Ft is 1 or not. If the answer is no the process proceeds to step 4.

In step 4 it is checked if the absolute value of $\Delta Hf$ is equal to or greater than a limit value a, and if the answer is yes, the process proceeds to step 5. In step 5 it is checked if a timer for $T_1$ is on or not. If the answer is no, the process proceeds to step 6, and it is checked if a timer for $T_0$ is on. If the answer is no, the process proceeds to step 7, and the timer for $T_0$ is started. Then the process proceeds to step 8.

On the other hand, if the answer in step 5 is yes, the process proceeds to step 8 while bypassing steps 6 and 7. Similarly, if the answer in step 6 is yes, the process proceeds to step 8 while bypassing step 7.

Figure 5:
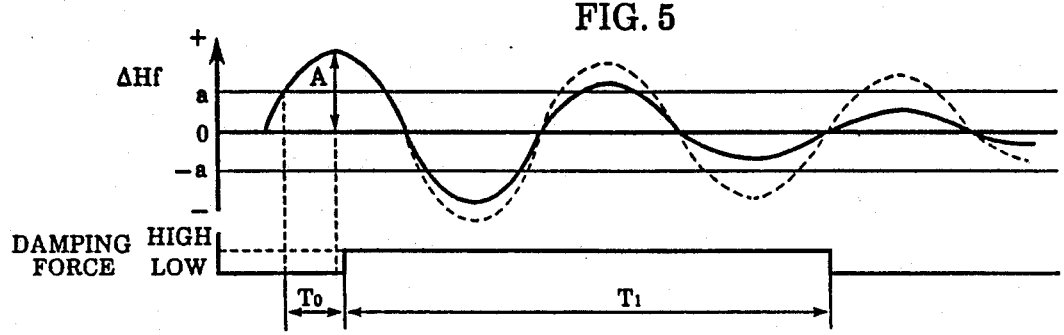
FIGS. 5, 6 and 7 are graphs showing examples of the progress of the damping control according to the flowchart in FIG. 3.
Figure 6:
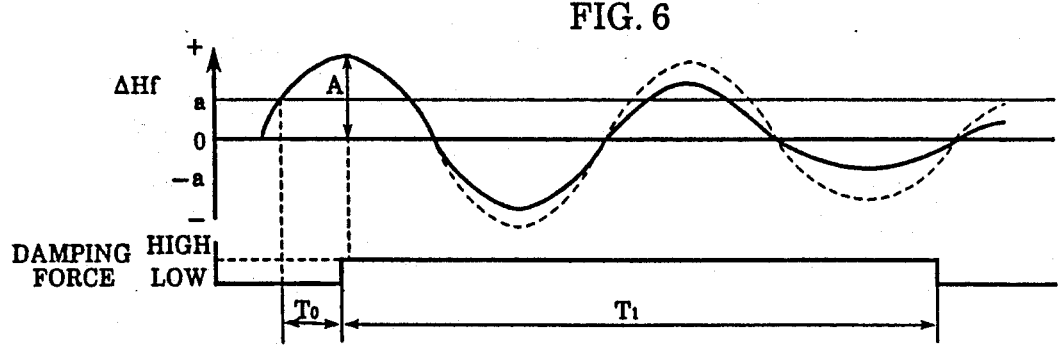
Figure 7:
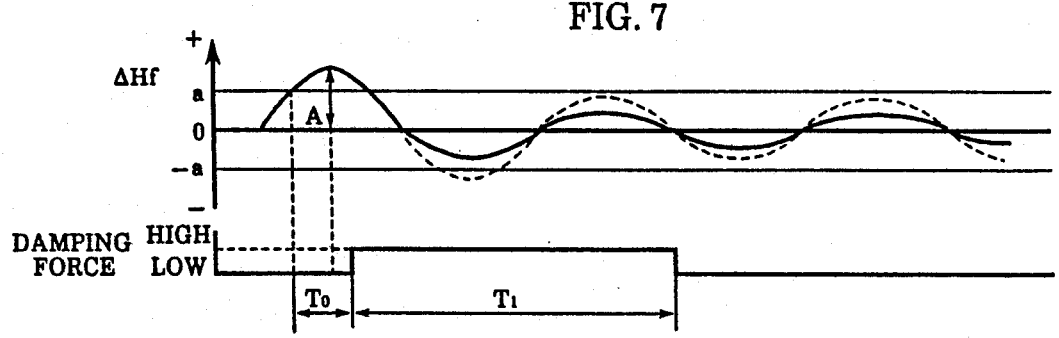

In step 8 it is checked if the absolute value of the vehicle height difference calculated in step 2 of the current flow of processes, i.e. $\Delta Hf_n$, is equal to or smaller than the absolute value of the vehicle height difference calculated in step 2 in the flow process just preceding to the current flow process, i.e. $\Delta Hf_{n-1}$. If the answer in step 8 is yes, it means that the vehicle height difference has reached a maximum point of variation or an apex point of a mount of variation of the vehicle height difference. Then the process proceeds to step 9, and a time duration $T_1$ for setting the shock absorber to the high damping force operation is obtained from a map which is shown in FIG. 4 according to the maximum or peak amplitude value A of the vehicle height difference $\Delta Hf$ (FIGS. 5-7). As shown in FIG. 4, the time duration $T_1$ is increased along with increase of the maximum value A. Such a map is stored in ROM 48. Then the process proceeds to step 10, and the flag Ft is set to 1. Then the process proceeds to step 11.

On the other hand, if the answer in step 8 is no, the process proceeds to step 11 while bypassing steps 9 and 10.

In step 11 it is checked if a predetermined time duration $T_0$ has lapsed or not. Since the timer for $T_0$ is started in step 7, it is checked in step 11 if the predetermined time $T_0$ has lapsed from the time point when the vehicle height difference exceeded the limit value a. If the answer in step 11 is yes, the process proceeds to step 12, and the timer for $T_0$ is stopped, and then the process proceeds to step 13, and the timer for $T_1$ is started. Then the process proceeds to step 14. In step 14 it is decided that the shock absorber is set to the high damping force operation.

On the other hand, if the answer in step 4 is no, that is, if the absolute value of the vehicle height difference calculated in step 2 of the current flow process is not greater than the limit value a, the process proceeds to step 15, and it is checked if the absolute value of the vehicle height difference calculated in step 2 in the flow process just preceding to the current flow process through the flowchart, i.e. $\Delta Hf_{n-1}$, is equal to or greater than the limit value a. If the answer is no, the process proceeds to step 16, and it is checked if the timer for $T_1$ is put on. If the answer is yes, the process proceeds to step 17, and it is checked if the time counted by the timer for $T_1$ has counted the time $T_1$. If the answer is yes, the process proceeds to step 18, and the flag Ft is reset to 0. Then the timer for $T_1$ is stopped.

On the other hand, if the answer in step 15 is yes, the process proceeds to step 20, and it is checked if the timer for $T_0$ is put on. If the answer is yes, the process proceeds to step 9, whereas if the answer is no, the process proceeds to step 21. When the answer in step 16 is no, the process also proceeds to step 21.

On the other hand, when the answer in step 3 is yes, the process proceeds to step 22, and it is checked if the timer for $T_1$ is put on. If the answer is yes, the process proceeds to step 17, whereas if the answer is no, the process proceeds to step 11. When the answer in step 17 is no, the process proceeds to step 14.

In step 21 it is decided that the shock absorber is set to the low damping force operation.

After step 14 or step 21, the process proceeds to step 23, and the electric control means 42 operates the actuators 28 and 30 through the driving circuits 62 and 64 to set the shock absorber either to the high damping force operation or the low damping force operation according to whether the high damping force operation was set in step 14 or the low damping force operation was set in step 21. Then the process returns to repeat the flow process.

The control performance obtained by the damping force control system according to the present invention is shown in FIGS. 5-7 with respect to three different examples. In the example shown in FIG. 5, when the vehicle height difference $\Delta Hf$ has exceeded the upper limit value a, the timer for $T_0$ is started. The amount of the vehicle height difference is of a medium size, and therefore the point of maximum value A of the vehicle height difference occurs before the time duration $T_0$ expires. Therefore, the shock absorber is switched over to the high damping force operation after the vehicle height difference has reached its maximum value. Then the shock absorber is continually operated for the time duration of $T_1$ of a medium length as determined according to the map shown in FIG. 4.

When the amount of the vehicle height variation is relatively large as shown in FIG. 6, the time duration $T_0$ expires before the vehicle height difference reaches its maximum value A, and therefore the shock absorber is switched over to the high damping force operation before the vehicle height difference reaches its maximum value, and then the shock absorber is continually operated for the time duration $T_1$ which is relatively long as also determined according to the map shown in FIG. 4.

By contrast, if the amount of the vehicle height difference is relatively small as shown in FIG. 7, the time duration $T_0$ lapses substantially after the vehicle height variation reached its maximum value, and then the shock absorber is switched over to the high damping operation. Then the shock absorber is operated at the high damping force for the time duration $T_1$ which is however relatively short. In FIGS. 5-7 the performance curves shown by broken lines indicate the changes of the vehicle height difference that would occur when the shock absorber had been maintained at the low damping force operation.

Figure 8:
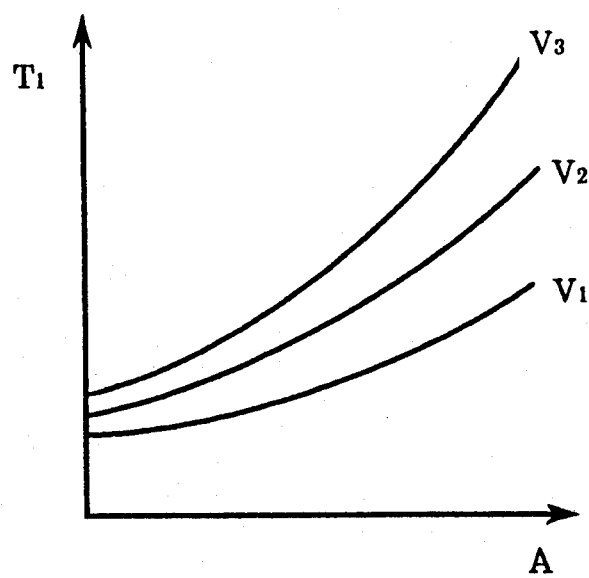
FIG. 8 is a graph similar to that shown in FIG. 4, showing a modification of the relation between the two variables.

The time duration $T_1$ for maintaining the shock absorber at the high damping force operation may be determined relative to the maximum value A of the vehicle height difference as well as the vehicle speed like a map shown in FIG. 8. According to this map the time duration $T_1$ is increased for the same maximum value A of the vehicle height difference as the vehicle speed increases from $V_1$ to $V_2$ and further from $V_2$ to $V_3$. By this arrangement it is possible to ensure good stability in maneuvering at high vehicle speed without deteriorating anti-vibration characteristic in low vehicle speed running.

Although the invention has been described with respect to a preferred embodiment thereof, it will be apparent to those skilled in the art that various modifications of the shown embodiment are possible without departing from the spirit of the present invention.

We claim:

1. A damping force control system for a shock absorber mounted between a vehicle wheel and a vehicle body of a vehicle such as an automobile and adapted to selectively provide a high damping force operation or a low damping force operation, comprising a vehicle height difference detecting means for detecting a vehicle height difference of the vehicle body relative to the vehicle wheel, and a shock absorber control means for controlling said shock absorber to provide said high damping force operation or said low damping force operation, wherein said shock absorber control means controls said shock absorber to provide said high damping force operation for a determinate time duration after the lapse of a predetermined delay period from a time point at which said vehicle height difference exceeds a determinate limit value, said delay period being determined so as to start said high damping force operation approximately when the vehicle height difference reaches a peak amplitude of variation thereof, said determinate time duration being determined to be longer as said peak amplitude of said vehicle height difference exceeding said determinate limit value is larger.

2. A damping force control system according to claim 1, further comprising a vehicle speed detecting means, wherein said determinate time duration for setting said shock absorber at said high damping force operation is varied according to vehicle speed detected by said vehicle speed detecting means so as to be increased along with increase of vehicle speed.

* * * * *